(12) United States Patent
Follows et al.

(10) Patent No.: US 8,684,165 B2
(45) Date of Patent: Apr. 1, 2014

(54) INFEED COLLATION SYSTEM

(76) Inventors: Chris Follows, Beamsville (CA); Kevin Crosby, Beamsville (CA)

(*) Notice: Subject to any disclaimer, the term of this patent is extended or adjusted under 35 U.S.C. 154(b) by 0 days.

(21) Appl. No.: 13/372,598

(22) Filed: Feb. 14, 2012

(65) Prior Publication Data

US 2012/0211329 A1 Aug. 23, 2012

Related U.S. Application Data

(60) Provisional application No. 61/443,745, filed on Feb. 17, 2011.

(51) Int. Cl.
*B65G 47/26* (2006.01)

(52) U.S. Cl.
USPC ... 198/426; 198/484.1; 198/570; 198/803.13; 271/315

(58) Field of Classification Search
CPC ....................................................... B65G 47/30
USPC ......... 198/457.03, 411, 412, 413, 418, 418.1, 198/406, 457.01, 456
See application file for complete search history.

(56) References Cited

U.S. PATENT DOCUMENTS

| 5,127,209 | A * | 7/1992 | Hunter | 53/439 |
| 2010/0012465 | A1* | 1/2010 | Webb | 198/461.1 |
| 2012/0128460 | A1* | 5/2012 | Webb | 414/783 |

* cited by examiner

*Primary Examiner* — Ramya Burgess
*Assistant Examiner* — Lester Rushin

(57) ABSTRACT

The present device is a collator and an infeed conveyor wherein the collator receives product from the infeed conveyor at an infeed point of the infeed conveyor. The product includes a flat side and an edge side and the collator and infeed conveyor are adapted to select between delivery of the product to the collator at an on flat load position and delivery of the product to the collator at an on edge load position. Preferably the collator includes an adjustment mechanism for urging the collator between a left position and a right position and the conveyor includes an height adjustment mechanism for urging the conveyor between a raised position and a lowered position.

16 Claims, 10 Drawing Sheets

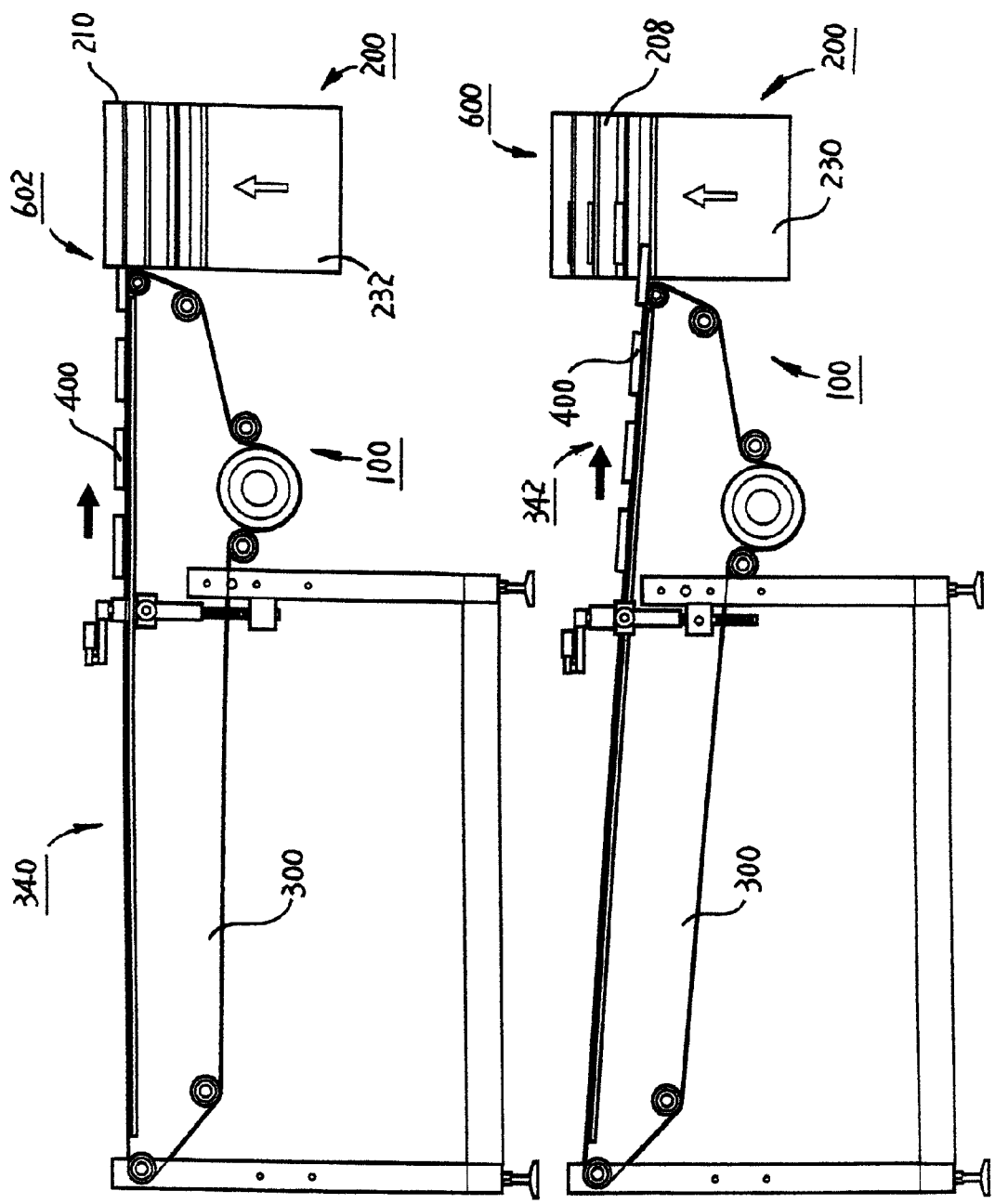

INFEED COLLATION SYSTEM

This application claims priority from previously file U.S. provisional patent application 61/443,745 filed Feb. 17, 2011 under the title Infeed Collation System by Chris Follows and Kevin Crosby.

FIELD OF THE INVENTION

The present device is a collator and method of use in which the collator together with an infeed conveyor feeding the collator is configured to be able to orient products onto their flat surface and/or orient products onto their edge surface by repositioning of the collator and infeed conveyor.

BACKGROUND OF THE INVENTION

The present device and infeed collation system is used to present packaged products in a predetermined orientation for subsequent loading into boxes or other final packaging containers.

Typically products are rectangular in shape and/or have a more or less flat surface and a more or less edge surface in their geometry.

In some instances it is desirable to be able to pre-orient the products all onto their flat surface for subsequent loading into boxes and other packaging.

In other instances it is desirable to pre-orient all of the products onto their edge for subsequent packaging into boxes and other packaging.

Historically collation systems are set up to either orient incoming products onto their flat surface and/or onto their edge surface but not both. In the industry this is termed packaging on the flat versus packaging on the edge.

Presently separate systems are required in order to package on the flat and package on the edge.

It is desirable to have a collation system which has the capability of orienting a product onto its flat surface prior to packaging into boxes and also have the capability and the flexibility to when desired be able to orient the product onto its edge surface for subsequent filling of boxes.

SUMMARY OF THE INVENTION

In combination a collator and an infeed conveyor wherein the collator receives product from the infeed conveyor at an infeed point of the infeed conveyor and the product includes a flat side and an edge side. The collator and infeed conveyor are adapted to select between delivery of the product to the collator at an on flat load position and delivery of the product to the collator at an on edge load position.

Preferably wherein the collator including an horizontal adjustment mechanism for urging the collator between a left position and a right position.

Preferably wherein the conveyor including an height adjustment mechanism for urging the conveyor between a raised position and a lowered position.

Preferably wherein the conveyor pivoting about a pivot point when urged between the raised position and the lowered position, such that a product receiving point proximate the pivot point remains substantially unaltered when the conveyor in either position.

Preferably wherein the horizontal adjustment mechanism urging the collator along an horizontal direction.

Preferably wherein the height adjustment mechanism urging an in feed point of the conveyor substantially along a vertical direction.

Preferably wherein the collator including at least two receptacle trains and each train including numerous side by side product receptacles wherein each receptacle including receptacle walls projecting outwardly from a collator belt thereby defining a receptacle slot.

Preferably wherein at the on edge load position product is urged into the product receptacle such that the flat side is adjacent and parallel to the receptacle wall.

Preferably wherein at the on flat load position product is urged onto the receptacle such that the flat side is adjacent and parallel to the conveyor belt.

BRIEF DESCRIPTION OF THE DRAWINGS

The present device and system will now be described by way of example only with reference to the following drawings in which;

FIG. 10 is a schematic side elevational view of the infeed conveyor together with the collator shown orienting the product on the flat.

FIG. 11 is a side elevational view of an infeed conveyor together with a collator shown orienting product on the edge.

DETAILED DESCRIPTION OF THE PREFERRED EMBODIMENTS

Figure 8:
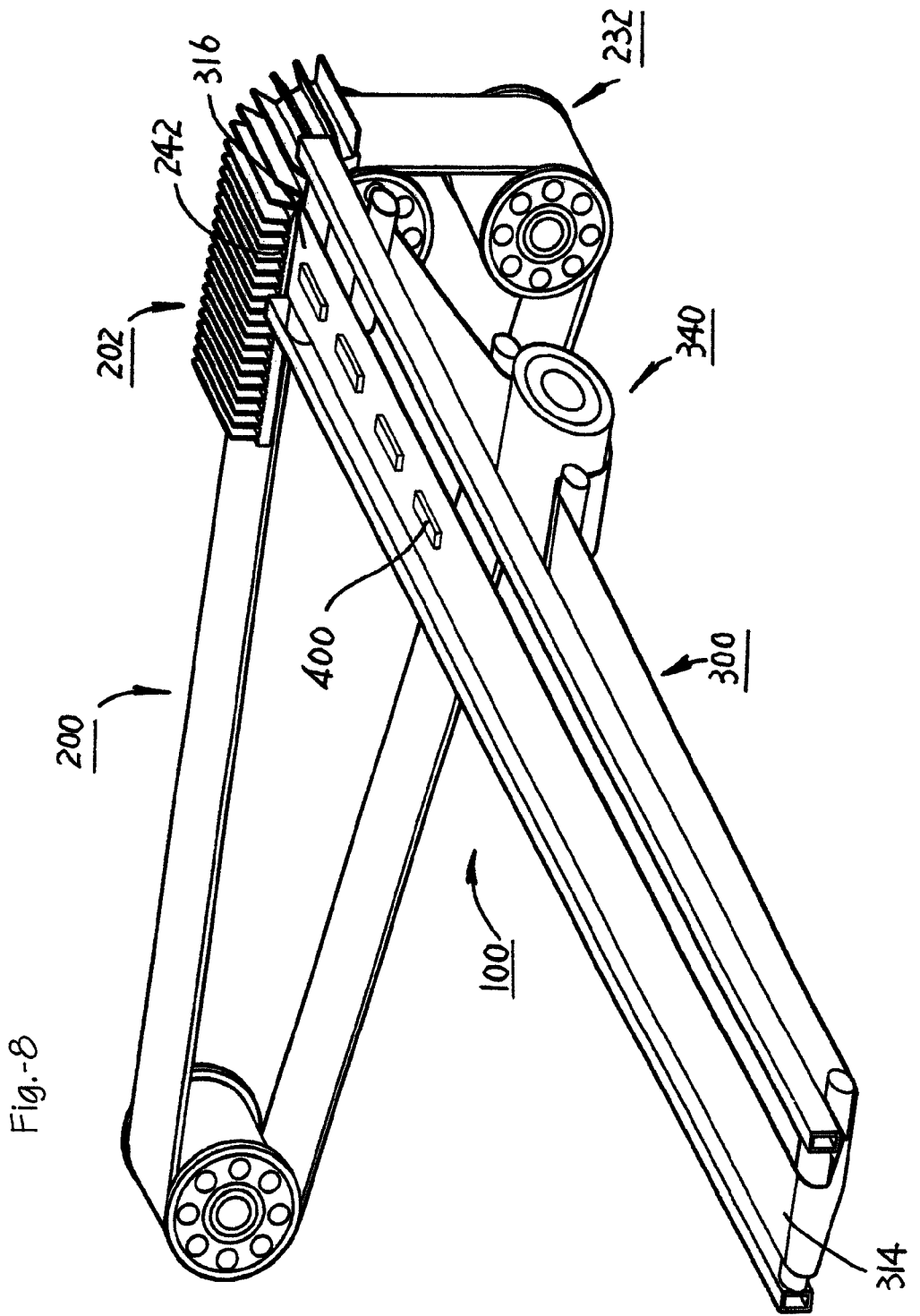
FIG. 8 is a schematic perspective view of a collator deployed together with an infeed conveyor showing the infeed conveyor in the raised position the collator in the right position and packaging the product on the flat.
Figure 9:
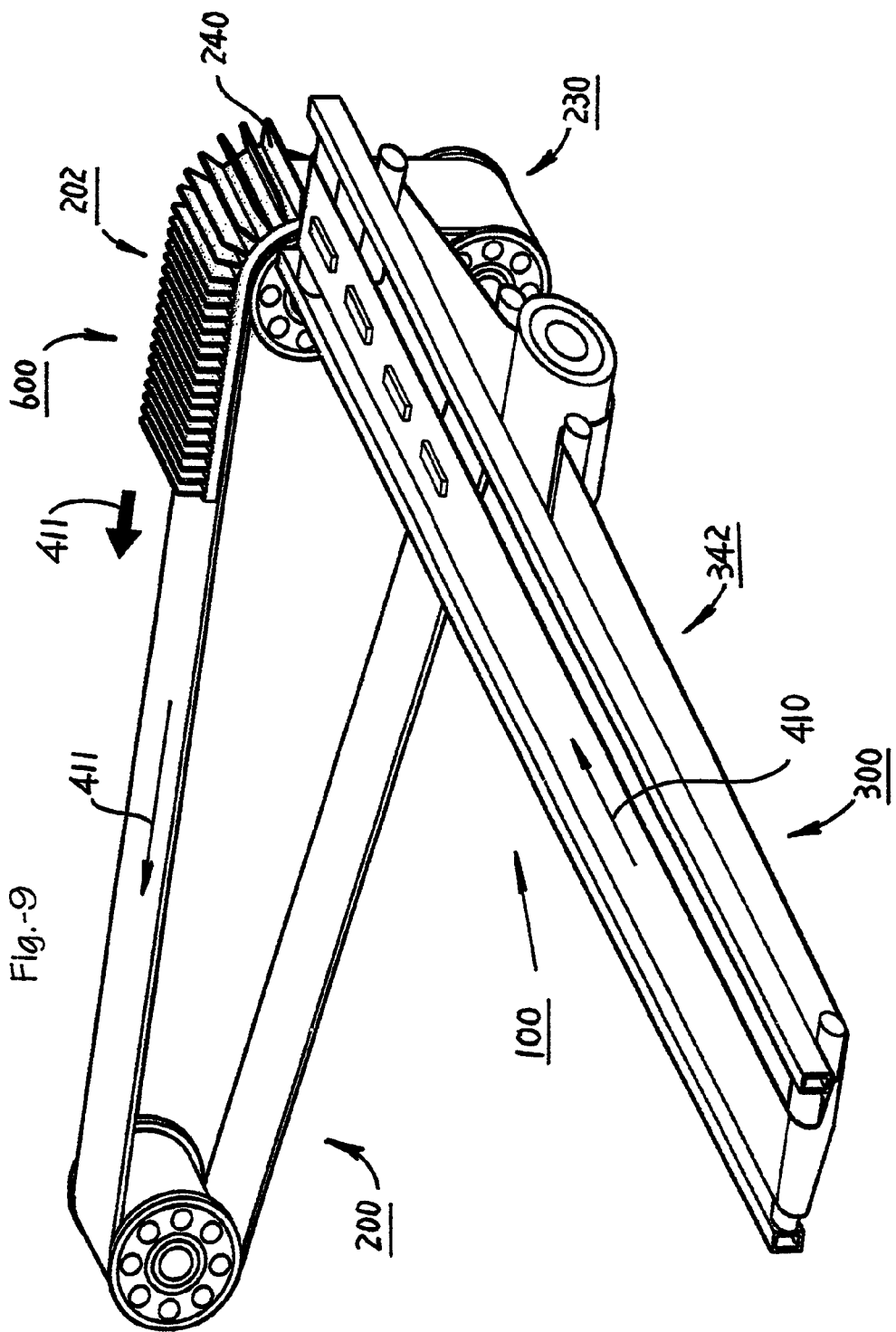
FIG. 9 is a schematic perspective view of a collator deployed together with an infeed conveyor showing the infeed conveyor in the lowered position the collator in the left position and packaging the product on the edge.

The infeed collation system shown in overview fashion in FIGS. 8 & 9 generally as 100 includes the following major components namely collator 200 and infeed conveyor 300.

Infeed collation system 100 is used in the packaging of products in particular is used in the packaging of food products however is not limited to food products. In addition the present device is particularly useful for products shown generally as 400, which include a flat side 402 and an edge side 404. Products 400 could be for example chocolate bars, granola bars and/or any other items, which need to be collated and packaged into boxes.

Figure 1:
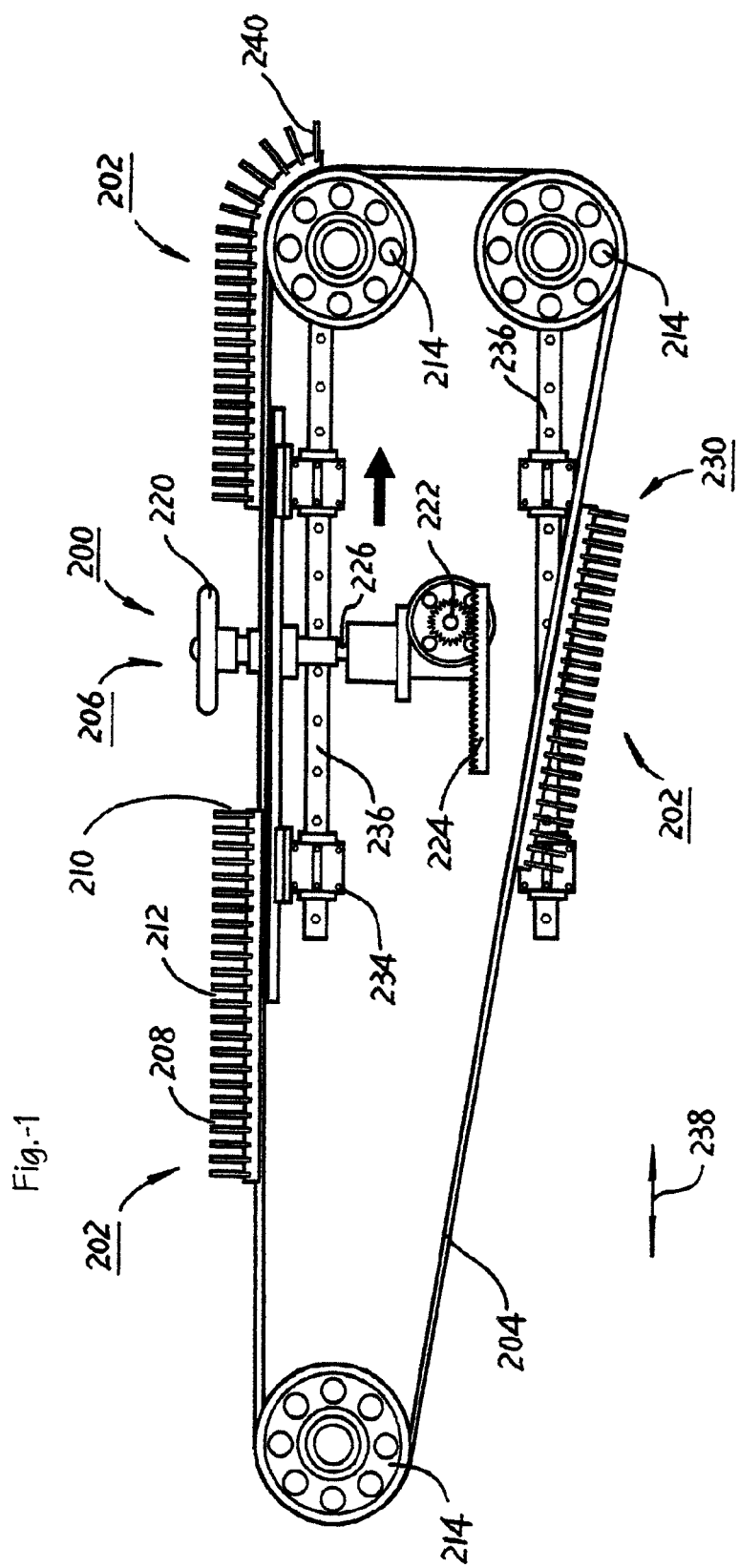
FIG. 1 is a side elevational view of three-train collator together with an horizontal adjustment mechanism showing the collator in the left position, for packaging on the edge.
Figure 2:
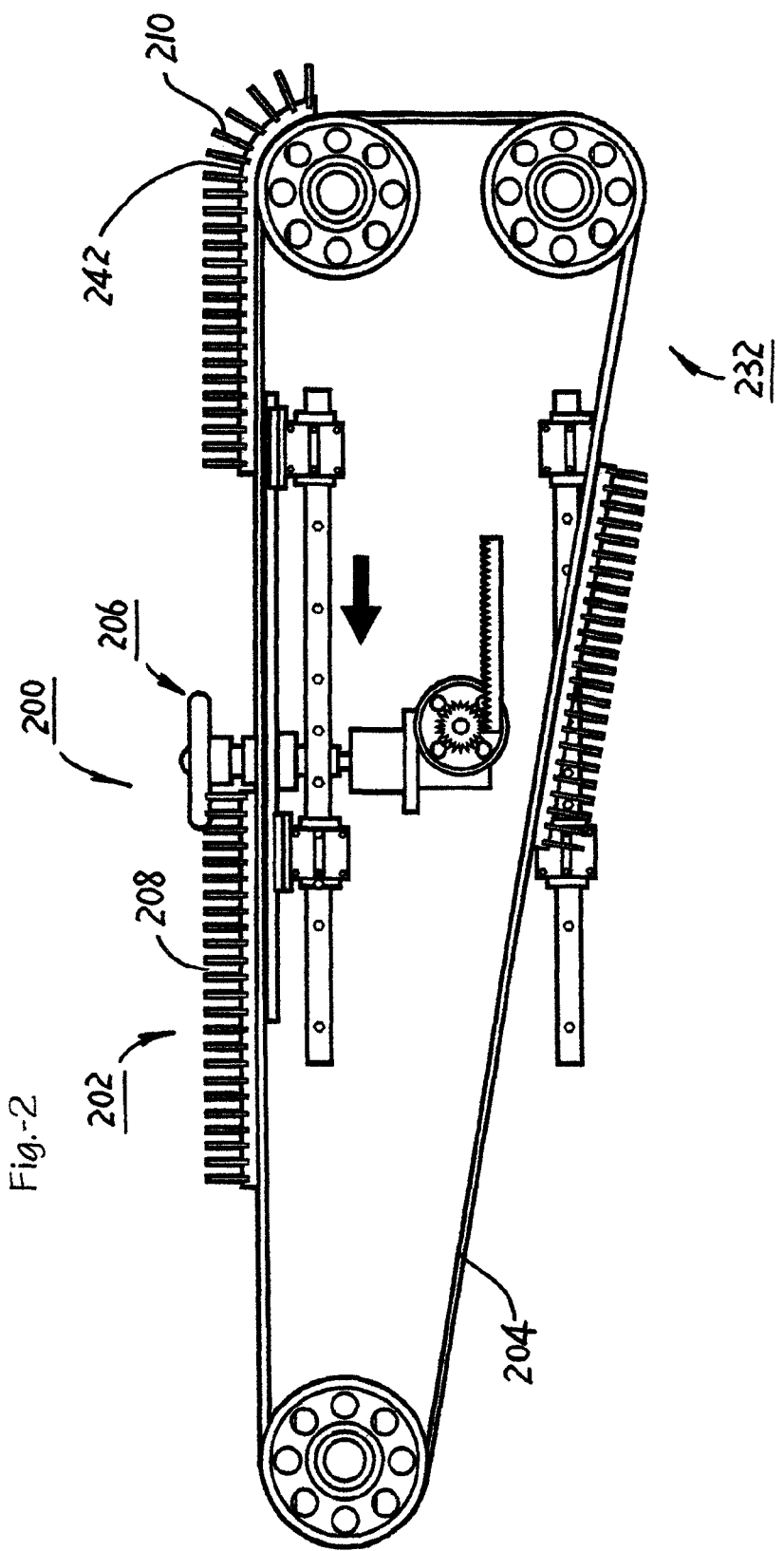
FIG. 2 a side elevational view of a three-train collator shown in FIG. 1 together with the horizontal adjustment mechanism with the collator in the right position, for packaging on the flat.

Referring now to FIGS. 1 & 2 collator 200 includes the following major components namely receptacle train 202 collator belt 204 and an horizontal adjustment mechanism 206. Depicted collator 200 is a three-receptacle train 206 collator 200 which are fastened to a collator belt 204.

Each receptacle train 202 includes product receptacles 208 having receptacle walls 210 and define a receptacle slot 212. Collator belt 204 is supported and driven by belt rolls 214.

Horizontal adjustment mechanism 206 includes an adjusting wheel 220, a pinion 222, a rack 224 and a shaft 226. By turning wheel 220 one is able to move the collator 200 from a left position shown as 230 in FIG. 1 to a right position shown as 232 in FIG. 2. Collator 200 is mounted via rail bearings 234 onto rails 236.

Horizontal adjustment mechanism 206 moves collator 200 along the horizontal direction shown as 238. Horizontal adjustment mechanism 206 may be another arrangement not shown in the drawings.

Figure 6:
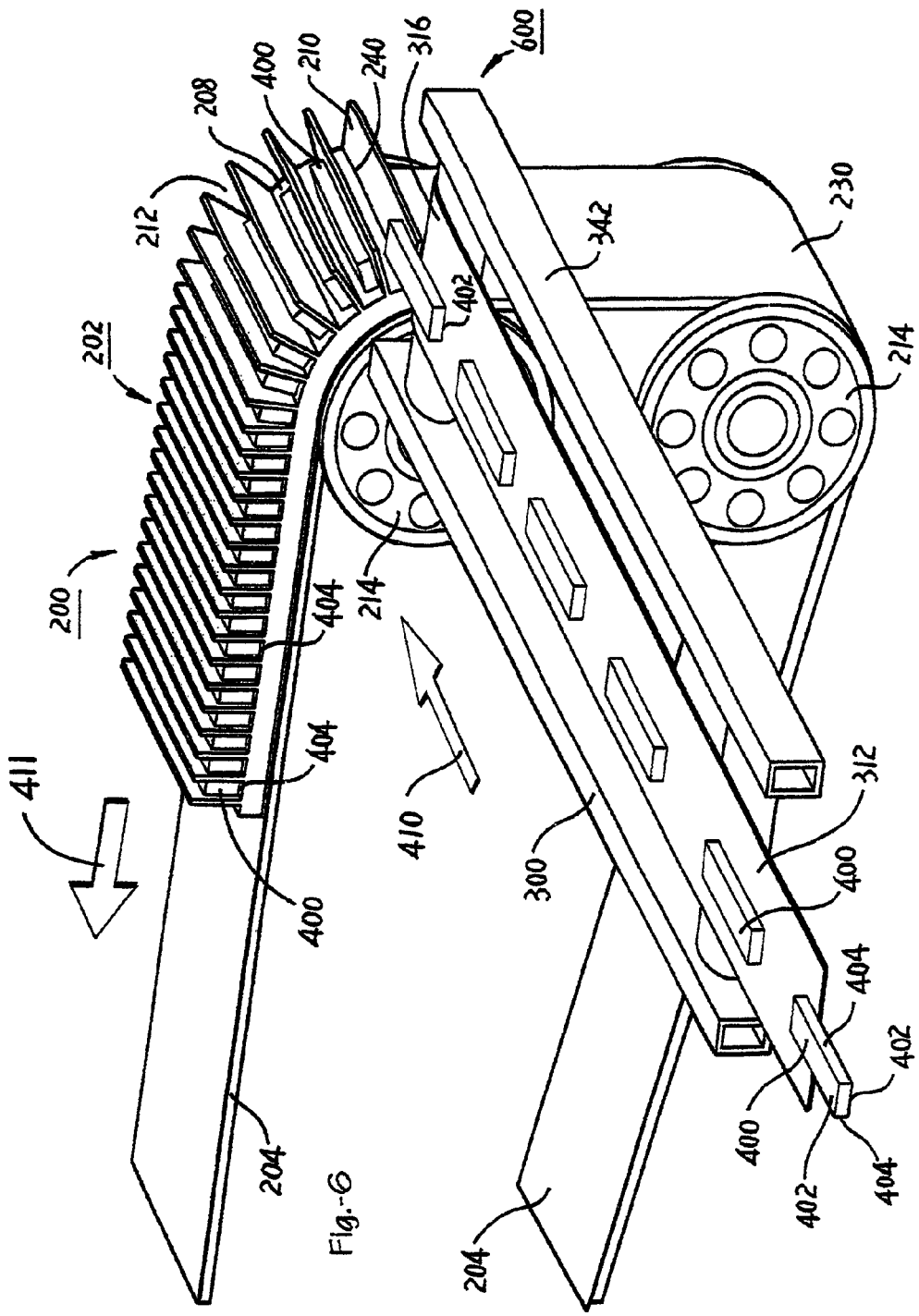
FIG. 6 is a partial cut away perspective view of the collator deployed together with the infeed conveyor shown orienting product on the edge.

When collator 200 is in the left position 230 as shown in FIGS. 6 and 9, product 400 is loaded into product receptacles 208 at the on edge load position 240 shown in FIG. 6. At the on edge load position shown as 240 receptacle wall 210 is horizontal and receives the flat 402 of product 400 parallel to the surface of the receptacle wall.

Figure 7:
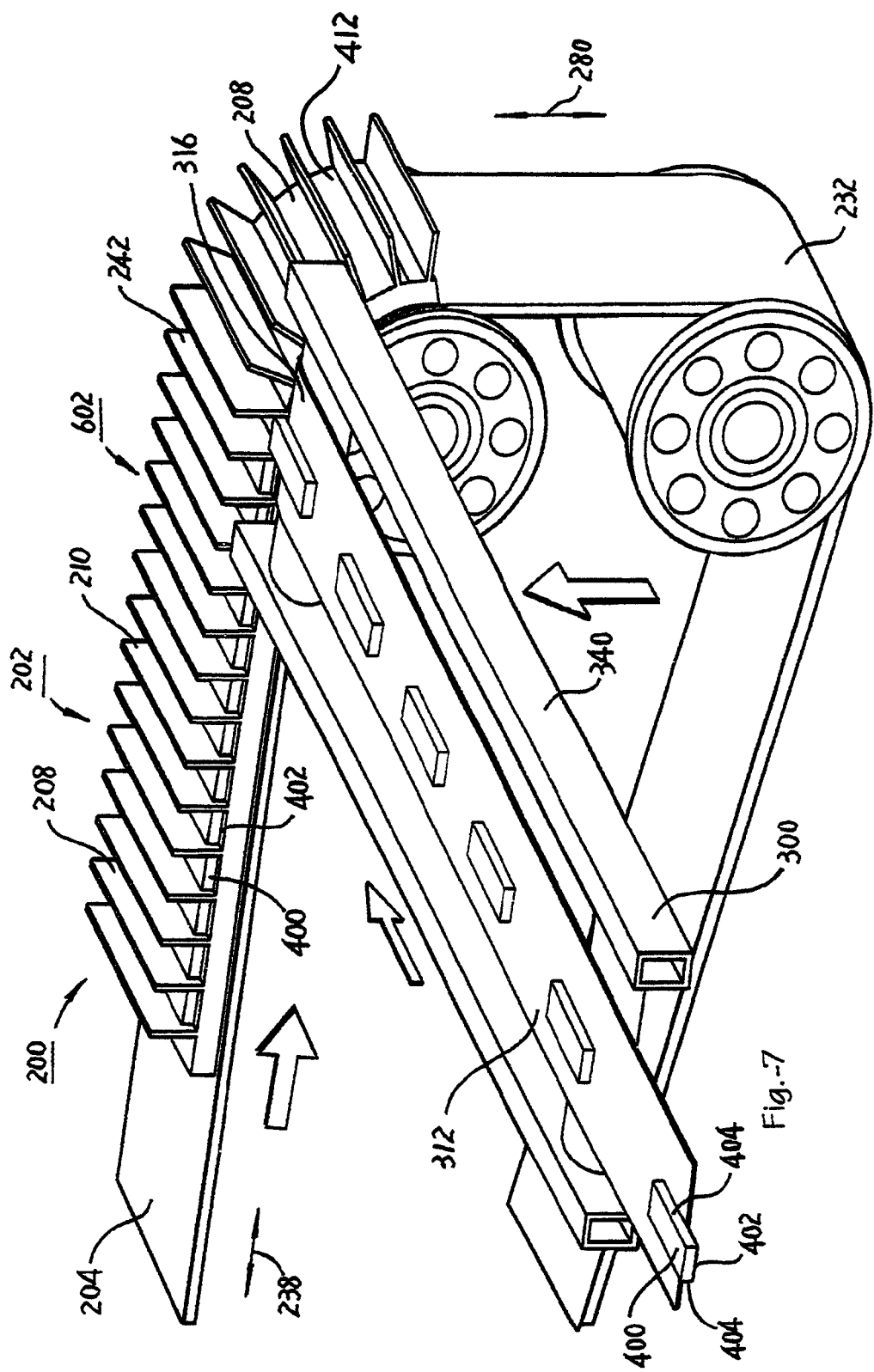
FIG. 7 is a partial cutaway perspective view of a collator deployed with an infeed conveyor shown orienting product on the flat.

FIGS. 7 and 8 shows collator 200, which is identical to collator 200 shown in FIG. 6 other than it is depicted in the right position 232. In the right position 232 product 400 is loaded into product receptacles 208 at the on flat load position 242. At the on flat load position 242 the flat portion 402 of product 400 is parallel with collator belt 204 and the edge 404 of product 400 is parallel to receptacle walls 210.

Figure 3:
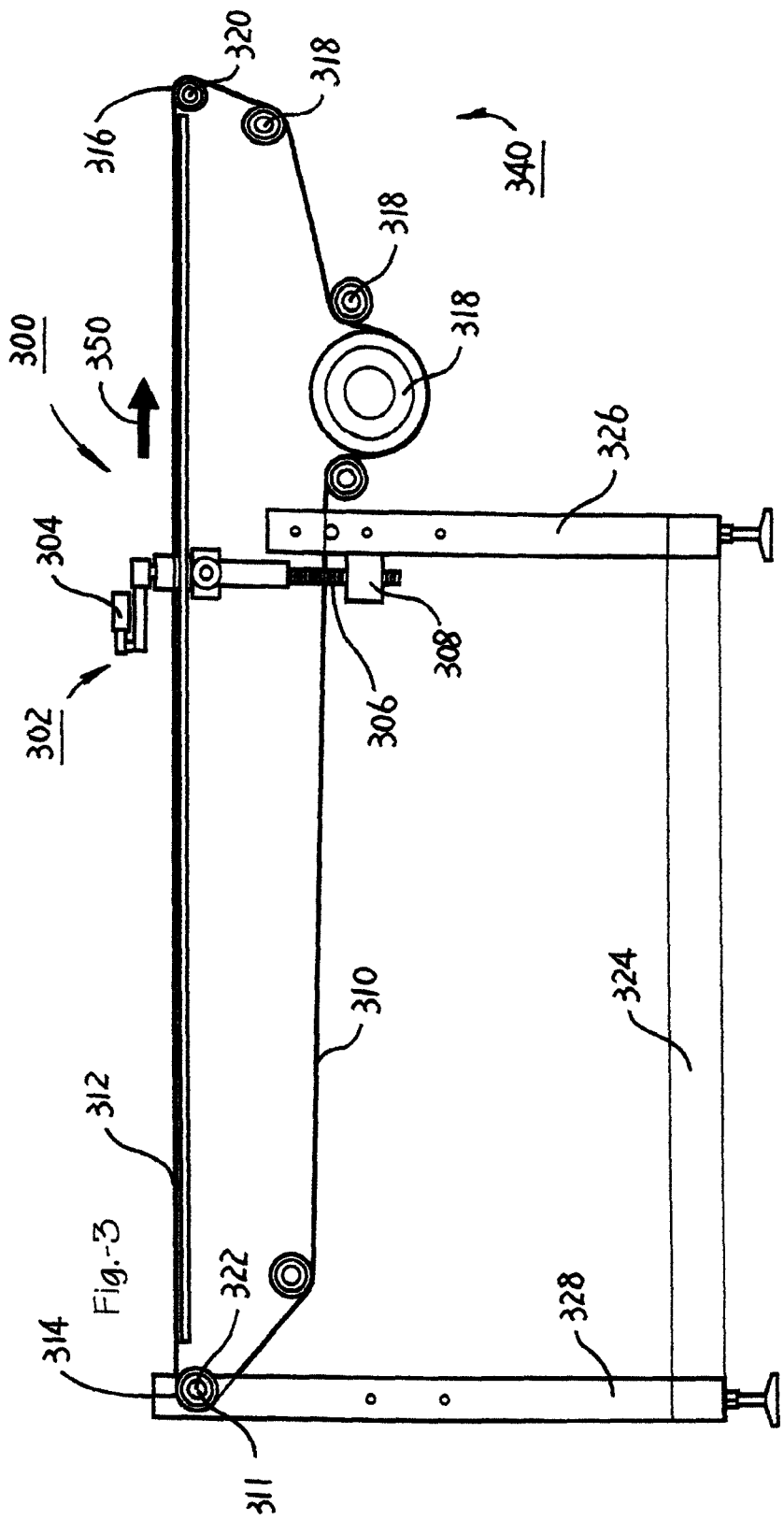
FIG. 3 is a side elevational view of an infeed conveyor together with a height adjustment mechanism shown in the raised position, for packaging on the flat.
Figure 4:
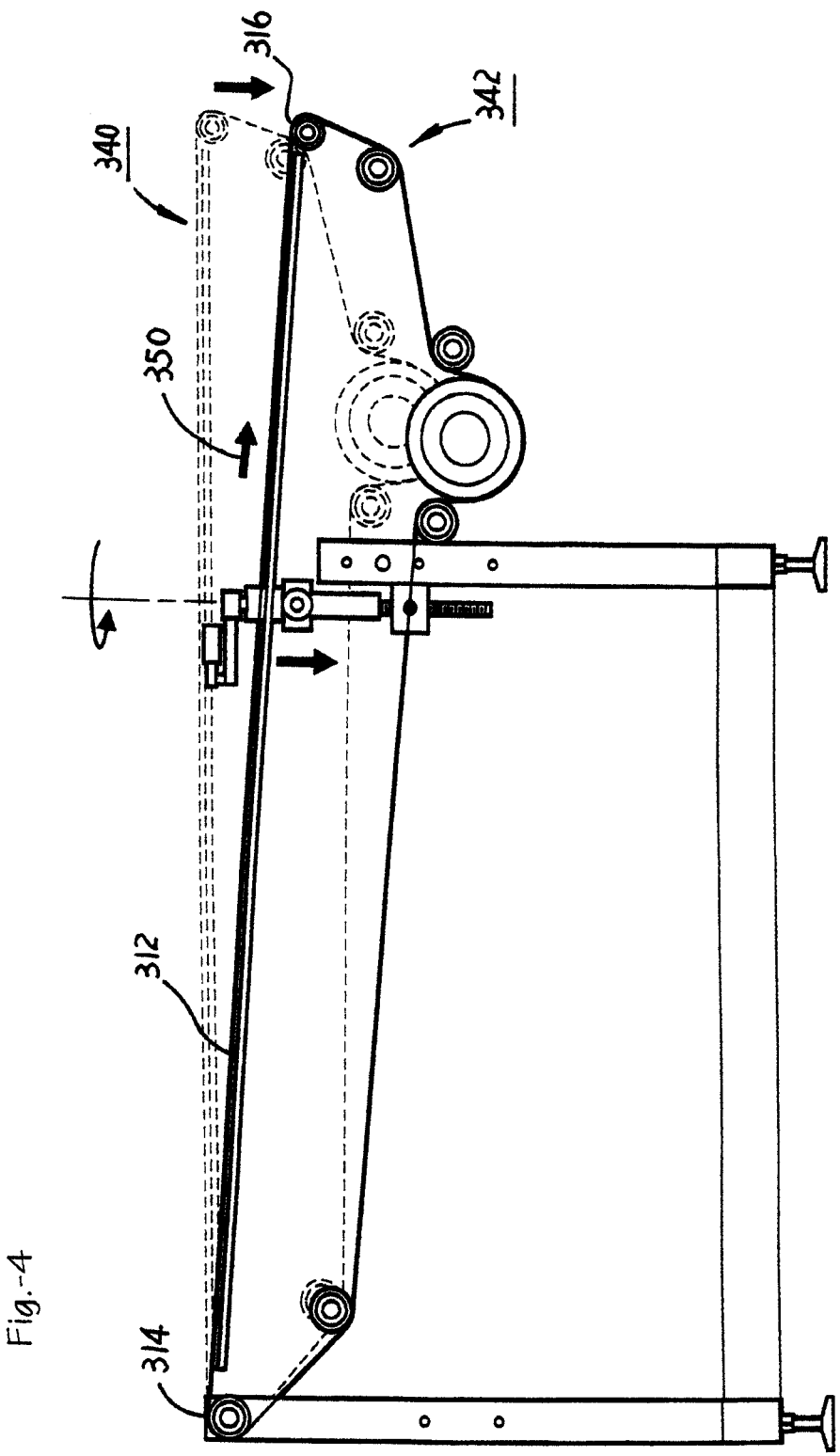
FIG. 4 is a side elevational view of the infeed conveyor together with the height adjustment mechanism shown in the lowered position for packaging on the edge.
Figure 5:
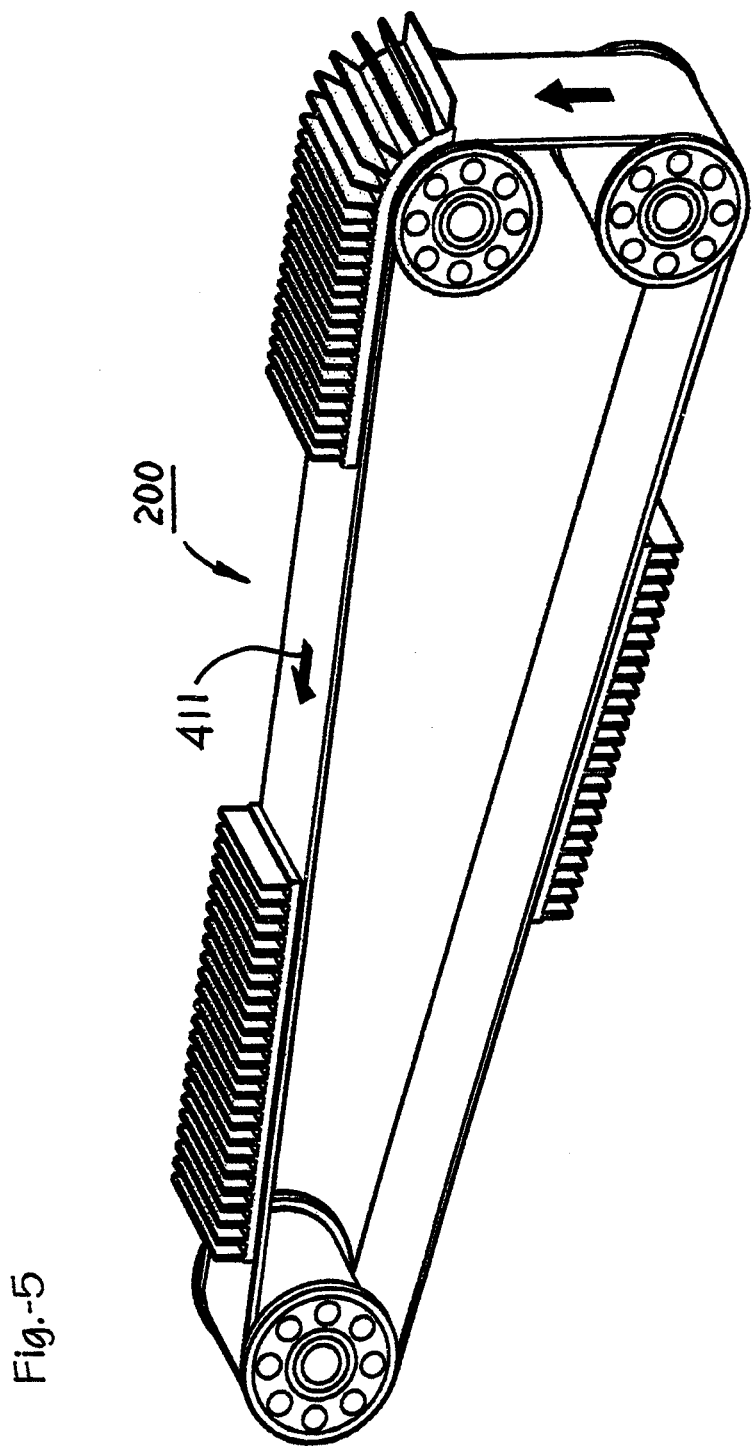
FIG. 5 is a top side perspective view of a three-train collator.

Referring now to FIGS. 3 & 4 showing infeed conveyor 300 which includes the following major components namely height adjustment mechanism 302 which includes a turn handle 304, a threaded shaft 306 and a corresponding cooperating nut 308.

Infeed conveyor 300 further includes a conveyor 310, which has a product conveying surface 312, a product receiving point 314 and an infeed point 316.

Infeed conveyor 300 further includes guide rolls 318 including a front guide roll 320 and a rear guide roll 322.

Infeed conveyor 300 is supported by a frame 324, which includes front legs 326 and rear legs 328.

Rotating turn handle 304 raises and lowers the product conveying surface 312 which pivot point 311 which is about rear guide roll 322. In this manner one can raise or lower infeed point 316 to the desired height. In FIG. 3 infeed point 316 is shown in the raised position 340 which corresponds to delivering product 400 to the on flat load position 242 shown in FIG. 2. In FIG. 4 Infeed conveyor is shown in the lowered position 342 in which case the infeed point 316 corresponds to the on edge load position 240 shown in FIG. 1. The reader will note that one can select the height of infeed point 316 by operating height adjustment mechanism 302 and thereby obtain the desired level for infeed point 316. The reader will also note that product 400 flows along product conveying surface 312 in product flow direction 350 as shown in FIG. 4.

Referring now FIGS. 6 & 7, which are partial, cut away expanded views of a portion of the collator 200 and a portion of the infeed conveyor 300 near the infeed point 316.

Referring now to FIG. 6 infeed conveyor 300 is shown in the lowered position 342 thereby delivering product onto collator 200 in the on edge load position 240 wherein the product is resting substantially on the receptacle wall 210. In this configuration product conveying surface 312 delivers product 400, which is lying on its flat side 402 along an infeed direction 410 and onto receptacle wall 210 such that the flat side 402 of product 400 is parallel with receptacle wall 210. The conveyor belt 204 and collator 200 moves around belt roll 214 and product 400 is tipped upwardly such that product 400 is standing on its edge 404 such that edge 404 is parallel with collator belt 204 and the flat surface 402 of product 400 is parallel with the receptacle wall 210 of each product receptacle 208.

Referring now to FIG. 7 which again is a partial cut away expanded view of the collator 200 and the infeed conveyor 300 near the infeed point 316.

In FIG. 7 the infeed conveyor is in the raised position 340. The height adjustment mechanism 302 and moves the infeed point 316 of conveyor 300 in the vertical direction 280 until the desired height is received such that the product is delivered at the on flat load position 242 wherein the product is resting substantially on the receptacle bottom 412. Additionally in order to ensure that product 400 enters at the on flat load position 242 collator 200 is adjusted to the right position 232 as shown in FIG. 7 as well as in FIG. 2 such that product enters at the on flat load position 242 at collator 200. Collator 200 moves product along a collator transport direction 411 which is substantially at rights angles to the infeed direction 410 of the infeed conveyor 300.

The reader will note that product 400 enters product receptacle 208 such that the flat portion 402 of the product 400 is parallel with the collator belt 204.

Referring now to FIG. 8 which corresponds generally to FIG. 7 wherein product is being delivered to the collator at the on flat load position 242.

FIG. 9 corresponds generally to FIG. 6 in which product 400 is shown being loaded onto collator at the on edge load position 240.

The reader will note that this combination of collator 200 and infeed conveyor 300 which utilizes horizontal adjustment mechanism 206 as well as height adjustment mechanism 302 to adjust the horizontal position of the collator and the vertical position of the infeed conveyor 300 allows one to be able to select between packaging product 400 on the flat shown in FIG. 7 and/or packaging product 400 on the edge as shown in FIG. 6.

The reader will note that the adjustment mechanisms may be automated rather than manual as depicted. Additionally other mechanical or pneumatic or hydraulic mechanisms can be employed for the adjustment mechanisms although not depicted.

It should be apparent to persons skilled in the arts that various modifications and adaptation of this structure described above are possible without departure from the spirit of the invention the scope of which defined in the appended claim.

We claim:

1. In combination an infeed conveyor and a collator for collating product, the combination comprising;
   a) the infeed conveyor transporting product along an infeed direction to an infeed point of the infeed conveyor where the collator receives product from the infeed conveyor and conveys product along a collator transport direction, wherein the infeed direction and collator transport direction are oriented at substantially right angles to each other,
   b) the collator includes a collator belt with attached product receptacles wherein each receptacle includes receptacle walls oriented normal to the collator belt, and a receptacle bottom oriented parallel to the collator belt,
   c) a means for pre selectively adjusting the collator and infeed conveyor between delivery of the product to the collator at an on flat load position wherein the product is delivered resting substantially on the receptacle bottom and delivery of the product to the collator at an on edge load position wherein the product at an on edge load position is delivered resting substantially on the receptacle wall, d) such that the same collator and infeed conveyor can be utilized to selectively deliver product to the collator and collate product at an on flat load position and at an on edge load position, e) wherein the adjusting means including a horizontal adjustment mechanism for urging the collator between a left position and a right position.

2. The combination claimed in claim 1, wherein the adjustment means adapted such that when the horizontal adjustment mechanism is in a left position the product is delivered to the collator at an on flat load position.

3. The combination claimed in claim 1, wherein the adjustment means adapted such that when the horizontal adjustment mechanism is in a right position the product is delivered to the collator at an on edge load position.

4. The combination claimed in claim 1 wherein the adjusting means including a height adjustment mechanism for urging the conveyor between a raised position and a lowered position.

5. The combination claimed in claim 4 such that when the height adjustment mechanism in a raised position the product is delivered to the collator at an on flat load position.

6. The combination claimed in claim 4 such that when the height adjustment mechanism in a lowered position the product is delivered to the collator at an on edge load position.

7. The combination claimed in claim 1, wherein the adjusting means including a height adjustment mechanism for urging the conveyor between a raised position and a lowered position.

8. The combination claimed in claim 7 wherein the infeed conveyor pivots about a pivot point when it is urged between the raised position and the lowered position, such that a product receiving point proximate the pivot point remains substantially unaltered when the infeed conveyor urged between the raised and lowered position.

9. The combination claimed in claim 1, wherein the horizontal adjustment mechanism manually urging the collator along a horizontal direction.

10. The combination claimed in claim 4 wherein the height adjustment mechanism manually urging an in feed point of the infeed conveyor substantially along a vertical direction.

11. The combination claimed in claim 7 wherein the collator including at least two receptacle trains and each train including numerous side by side product receptacles wherein each receptacle including receptacle walls projecting outwardly from a collator belt thereby defining a receptacle slot.

12. In combination an infeed conveyor a collator and a product, the infeed conveyor and collator for collating product, the combination comprising;

a) the infeed conveyor transporting product along an infeed direction to an infeed point of the infeed conveyor where the collator receives product from the infeed conveyor and conveys product along a collator transport direction, wherein the infeed direction and collator transport direction are oriented at substantially right angles to each other, b) the product includes a flat side and an edge side, and the collator includes a collator belt with attached product receptacles wherein each receptacle includes receptacle walls oriented normal to the collator belt, and a receptacle bottom oriented parallel to the collator belt, c) a means for pre selectively adjusting the collator and infeed conveyor between delivery of the product to the collator at an on flat load position wherein the product is delivered resting substantially on the flat side on the receptacle bottom and delivery of the product to the collator at an on edge load position wherein the product at an on edge load position is delivered resting substantially on the flat side on the receptacle wall, d) such that the same collator and infeed conveyor can be utilized to selectively deliver product to the collator and collate product at an on flat load position and at an on edge load position, e) wherein the collator including an horizontal adjustment mechanism for urging the collator between a left position and a right position such that when the horizontal adjustment mechanism in a left position the product is delivered to the collator at an on flat load position and such that when the horizontal adjustment mechanism in a right position the product is delivered to the collator at an on edge load position.

13. The combination claimed in claim 12 wherein the infeed conveyor including a height adjustment mechanism for urging the conveyor between a raised position and a lowered position such that when the height adjustment mechanism in a raised position the product is delivered to the collator at an on flat load position and such that when the height adjustment mechanism in a lowered position the product is delivered to the collator at an on edge load position.

14. The combination claimed in claim 12, wherein the infeed conveyor including a height adjustment mechanism for urging the conveyor between a raised position and a lowered position.

15. The combination claimed in claim 14 wherein the collator including at least two receptacle trains and each train including numerous side by side product receptacles wherein each receptacle including receptacle walls projecting outwardly from a collator belt thereby defining a receptacle slot wherein at the on edge load position product is urged into the product receptacle such that the flat side is adjacent and parallel to the receptacle wall.

16. The combination claimed in claim 15 wherein at the on flat load position product is urged into the product receptacle such that the edge side is adjacent and parallel to the receptacle wall.

* * * * *